United States Patent [19]

Maynard et al.

[11] Patent Number: 5,557,299
[45] Date of Patent: Sep. 17, 1996

[54] METHOD AND APPARATUS FOR A LEARNING STYLED COMPUTER KEYBOARD

[75] Inventors: Victor K. Maynard; Kendall C. Maynard; Ruth Smith; Claire Calano, all of Niceville, Fla.

[73] Assignee: Kidtech, Inc., Niceville, Fla.

[21] Appl. No.: 238,216

[22] Filed: May 4, 1994

[51] Int. Cl.$^6$ ..................................................... G09G 5/00
[52] U.S. Cl. ........................... 345/168; 345/156; 341/22; 341/24; 341/34
[58] Field of Search ................................... 345/168, 156; 341/24, 25, 34, 22; 434/323, 339

[56] References Cited

U.S. PATENT DOCUMENTS

| | | | |
|---|---|---|---|
| 2,040,248 | 5/1936 | Dvorak et al. | 400/486 |
| 2,737,647 | 3/1956 | Oliwa | 341/25 |
| 4,463,349 | 7/1984 | Mochida et al. | 341/24 |
| 4,517,553 | 5/1985 | Engstrom | 341/25 |
| 4,519,721 | 5/1985 | Gardner | 400/472 |
| 4,536,160 | 8/1985 | Hatfield | 434/227 |
| 4,615,629 | 10/1986 | Power | 400/486 |
| 4,634,818 | 1/1987 | Hayes-Pankhurst et al. | 200/513 |
| 4,669,903 | 6/1987 | Herzog et al. | 400/489 |
| 4,701,747 | 10/1987 | Isherwood et al. | 341/24 |
| 4,818,827 | 4/1989 | Ipcinski et al. | 434/339 |
| 4,918,444 | 4/1990 | Matsubayashi | 341/25 |
| 4,927,279 | 5/1990 | Morgan | 400/486 |
| 4,963,044 | 10/1990 | Warner | 400/486 |
| 5,073,054 | 12/1991 | McDowell | 400/486 |
| 5,219,291 | 6/1993 | Fong et al. | 434/323 |
| 5,223,828 | 6/1993 | McKiel, Jr. | 345/168 |
| 5,406,273 | 4/1995 | Nishida et al. | 345/168 |
| 5,410,305 | 4/1995 | Barrus et al. | 345/168 |
| 5,430,266 | 7/1995 | Austin, Jr. et al. | |

OTHER PUBLICATIONS

"Keyboard Command Map for the IBM PC, PC/XT and look–alikes" of *Using WordPerfect* 3rd Edition by Beacham.

Ziolog, Z8602 Controls a 101/102 PC/Keyboard Feb., 1990. Product Brochure.

*Primary Examiner*—Richard Hjerpe
*Assistant Examiner*—Juliana S. Kim
*Attorney, Agent, or Firm*—Robert C. Kain, Jr.

[57] ABSTRACT

In one embodiment, the method and related apparatus for configuring and operating a computer keyboard includes providing a personal computer system having a monitor, central processing unit, memory, sound generator and a keyboard input/output interface. The keyboard is substantially flat and has a planar user interface surface with a plurality of discrete membrane switches protruding a small distance (less than one-eighth of an inch) above the surface. In addition, each switch is circumscribed by a key channel. The domes of each membrane switch enhance the tactile response to the child or young adult learning to use the keyboard because upon depression of the key face, the dome deforms into a concave shape and closes a normally open circuit junction in a key switch matrix beneath the user interface surface. The method as well as the apparatus electrically blocks the generation of multiple digital key strike signals whether based upon continual actuation of one of the key switches (i.e., continual depression of a single key) or whether based on actuation of a plurality of key switches within a pre-determined time period. Multiple digital key strike signals are inhibited by setting the microcontroller in the keyboard such that virtually all keys on the keyboard are configured as a "make only" key. This make only key strike routine is customarily used for the escape key on the standard computer keyboard. Inhibiting generation of multiple digital key strike signals based upon actuation of a plurality of key strikes (caused by a child depressing multiple keys) is enabled with a time out circuit either in the software on by the personal computer or the routines or programs in the microcontroller operating the keyboard.

25 Claims, 7 Drawing Sheets

METHOD AND APPARATUS FOR A LEARNING STYLED COMPUTER KEYBOARD

BACKGROUND OF THE INVENTION

The present invention relates to a method and an apparatus for a learning styled keyboard which enhances a user's education.

Computer systems, and specifically personal computer (PC) systems, usually include a visual display device or monitor, a central processing unit (normally mounted on a motherboard), various types of memory (including read only memory (ROM), random access memory (RAM), hard drives and removable memory devices such as floppy disc drives for 5¼" and 3½" disks), various input/output peripheral interface boards (normally one interface for the monitor, another for a telecommunications device such as a modem, and another for standard computer keyboard), a computer keyboard and, in some cases, a sound generator board. The standard computer system :keyboard is sometimes identified as a QWERTY keyboard which includes a key layout with alphabetic keys in a somewhat random fashion (hence the term QWERTY which is the alphabetic key layout along the top left hand row of the alpha key set), numeric keys located above the alphabetic keys and function keys F1–F12 located above the numeric keys. An example of the standard computer keyboard can be found in the product specification for the Z8602 keyboard microcontroller manufactured by Zilog of Campbell, Calif. The Z8602 microcontroller is utilized in conjunction with a 101/102 PC keyboard. The product brochure issued by Zilog has a publication date of February, 1990. The Z8602 microcontroller is designed for a PC keyboard and controls all scan codes, line status modes, scan timing and communications between the keyboard and the PC and particularly the motherboard and the central processing unit in the personal computer system. The product brochure describes and depicts a typical method of interfacing a standard keyboard to an XT/AT personal computer.

Other keyboards and key layouts are found in U.S. Pat. No. 4,669,903 to Herzog; U.S. Pat. No. 4,963,044 to Warner; U.S. Pat. No. 4,927,279 to Morgan; U.S. Pat. No. 4,536,160 to Hatfield; U.S. Pat. No. 5,073,054 to McDowell; U.S. Pat. No. 4,519,721 to Gardner; U.S. Pat. No. 4,615,619 to Power and U.S. Pat. No. 2,040,248 to Dvorak.

These patent disclosures illustrate various key layouts for keyboards. For example, the Herzog '903 patent disclosure generally illustrates the QWERTY key layout. The patent disclosures to Warner '044, Morgan '279, McDowell '054, Gardner '721 and Power '629 all illustrate different key layouts for the keyboard. Dvorak '248 discloses a further keyboard layout. Hatfield '160 illustrates a standard QWERTY keyboard layout.

None of these keyboard layouts specifically address the difficulties a child or a young adult encounters when learning to use an electronic, computer-based keyboard. The specific layout of the keys is only one barrier to learning the operation and interaction between the keys, the keyboard and the balance of the computer system. Other items not addressed by these prior art disclosures include tactile effects of the keyboard, providing electronic barriers to multiple key strikes and continual depression of a single key and further generating positive feedback during the educational session with the child or young adult. The present invention corrects these defects and overcomes these problems with the prior art keyboards.

OBJECTS OF THE INVENTION

It is an object of the present invention to provide a computer-based method for configuring and operating a computer keyboard to enhance a user's education of the keyboard, the alpha-numeric communicative skills and the operation of the computer system.

It is another object of the present invention to provide a learning styled keyboard which utilizes uniquely shaped keys having a special color coding.

It is a further object of the present invention to provide a :method to enhance a user's education by limiting multiple key strikes upon continual depression of a key.

It is a further object of the present invention to provide a method to enhance a user's education by inhibiting generation of multiple key strike signals based upon actuation of a plurality of key switches within a pre-determined time period.

It is a further object of the present invention to provide a learning styled keyboard which is electrically connecting in parallel with the standard computer keyboard.

It is a further object of the present invention to provide a method which utilizes a make-only key strike routine for substantially all the keys (except the cursor control).

It is a further object of the present invention to provide a keyboard wherein each key includes a circumscribed key channel and an underlying key switch configured as a membrane switch.

It is another object of the present invention to provide both positive and negative audio and/or visual feedback signals and indicators to the user.

It is another object of the present invention to provide a stand alone arm learning styled keyboard for use independent of a personal computer system.

It is an additional object of the present invention to use a detachable keyboard extension cable which allows direct connection to the personal computer without reaching behind the computer for cable removal and reconnection.

It is another object of the present invention to utilize a time delay feature which effectively disables keyboard commands from reaching the microprocessor in the personal computer for up to about 60 seconds during the initialization or boot-up of the computer.

SUMMARY OF THE INVENTION

In one embodiment, the method and related apparatus for configuring and operating a computer keyboard includes providing a personal computer system having a monitor, central processing unit, memory, sound generator and a keyboard input/output interface. The keyboard is substantially flat and has a planar user interface surface with a plurality of discrete membrane switches protruding a small distance (less than one-eighth of an inch) above the surface. In addition, each switch is circumscribed by a key channel. The domes of each membrane switch enhance the tactile response to the child or young adult learning to use the keyboard because upon depression of the key face, the dome deforms into a concave shape and closes a normally open circuit junction in a key switch matrix beneath the user interface surface. The method as well as the apparatus electrically blocks the generation of multiple digital key strike signals whether based upon continual actuation of one of the key switches (i.e., continual depression of a single key) or whether based on actuation of a plurality of key switches within a pre-determined time period. Multiple digital key strike signals are inhibited by setting the microcontroller in the keyboard such that virtually all keys on the keyboard are configured as a "make only" key. This make only key strike routine is customarily used for function keys like the escape key on the standard computer keyboard. Inhibiting generation of multiple digital key strike signals based upon actuation of a plurality of key strikes (caused by a child depressing multiple keys) is enabled with a time out circuit either in the software or by the personal computer or the routines or programs in the microcontroller operating the keyboard.

BRIEF DESCRIPTION OF THE DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENTS

The present invention relates to a computer-based method for configuring and operating a computer keyboard, specifically a learning styled keyboard, used in conjunction with a personal computer system and relates to a stand alone learning styled keyboard.

Figure 1:
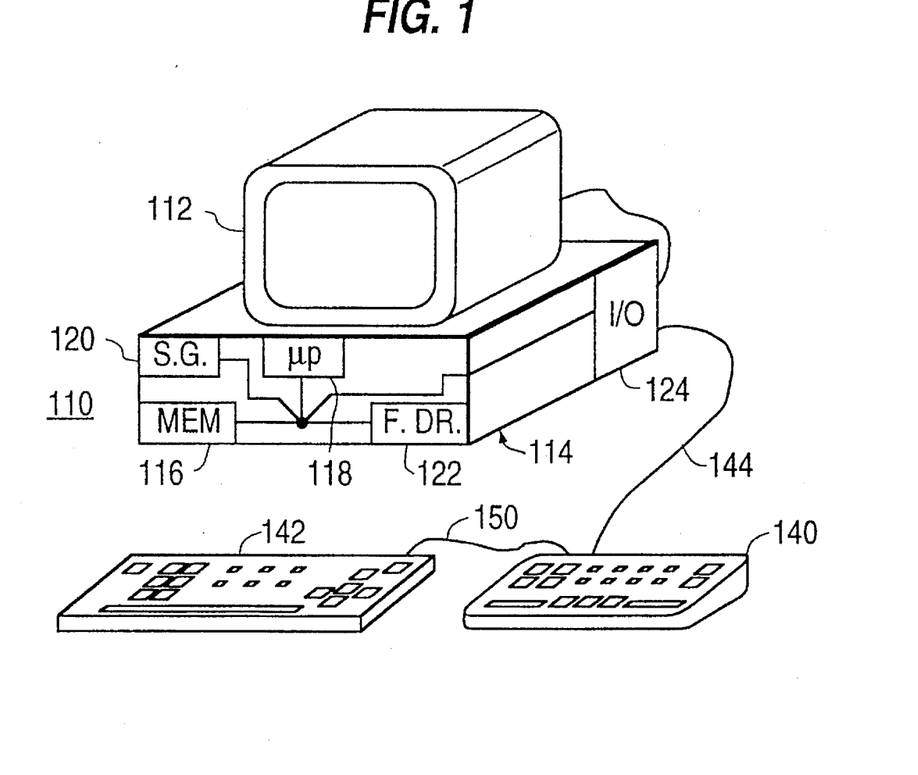
FIG. 1 diagrammatically illustrates a learning styled keyboard electrically connected to a personal computer system along with a standard computer keyboard.

FIG. 1 diagrammatically illustrates a personal computer system 110 including a display monitor 112 and a computer case 114. Case 114 includes, in its interior, memory 116, microprocessor or central processing unit 118, sound generator 120, removable memory device (floppy drive 122) and an input/output interface board 124. The memory, microprocessor, floppy drive, sound generator and input/output interface board are coupled together via an appropriate electronic bus. Monitor 112 and learning styled keyboard 140 as well as a standard computer keyboard 142 are electrically coupled to central processing unit or microprocessor 118 via input/output device or board 124. As is known in the art, monitor 112 may utilize its own input/output interface which may be mounted on the mother board carrying the microprocessor.

Figure 2A:
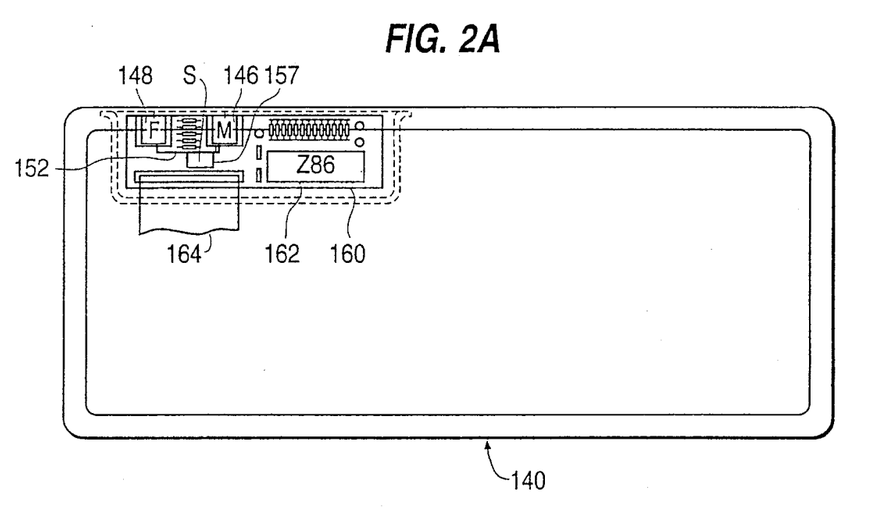
FIGS. 2A, 3 and 4 diagrammatically illustrate a top view, front elevational view and side elevational view of the learning styled keyboard.

As shown in FIG. 1 and FIG. 2A, learning styled keyboard 140 is electrically connected in parallel with standard keyboard 142. As illustrated in FIG. 1, computer keyboard extension cable 144 is connected to I/O 124 and learning styled keyboard 140. The keyboard extension cable 144 is plugged into appropriate Male M port 146 shown in FIG. 2A. The other Female F port 148 is connected to keyboard cable 150 extending from standard computer keyboard 142.

It should be noted that standard keyboard 142 can be eliminated from the learning styled computer system because the personal computer will sequence through the initialization routine without being affected by the learning styled keyboard 140. Keyboard 140 includes a delay circuit which inhibits recognition of all key strikes for approximately 60 seconds after initialization. In one embodiment, this latent delay is accomplished by inhibiting generation of the key strike signal to said computer system during said computer system initialization.

With respect to FIG. 2A, Male and Female ports 146, 148 are electrically connected together via jumper bundle 152. In a preferred embodiment, the jumper bundle or traces on a printed circuit board electrically connects the power and ground lines in both keyboards in parallel with the personal computer. Switch 157 (having an operator interface protruding from the back of the keyboard which is illustrated in FIG. 2A) enables the user to switch the clock and data lines (see FIG. 10) between the two keyboards. The ability of learning styled keyboard 140 to be easily connected to personal computer system 110 is a significant advantage of the present invention. In order to use the learning styled keyboard, the user simply disconnects keyboard cable extension 144 from standard keyboard cable 150, plugs extension cable 144 into port 146, at the back side of learning styled keyboard 140, and plugs standard keyboard cable 150 into the port 148 on the learning styled keyboard. With such configuration, personal computer 110 "sees" (or is electronically responsive to) standard keyboard 142 as well as learning styled keyboard 140 dependent upon the switch 157 setting. In such a configuration, learning styled keyboard 140 is electrically connected in parallel with standard keyboard 142. If the learning styled keyboard is being used by a child or a young adult and that user of the learning styled keyboard "jams" the personal computer (which locks the operation of the system), the adult or other teacher simply reboots or resets personal computer system 110 typically by changing the switch position and simultaneously depressing control, alternate and delete keys which are not present on the learning styled keyboard.

Further, the parallel connection of the learning styled keyboard with the standard computer keyboard enables the computer system incorporating the learning styled keyboard to have multiple uses and potentially interactive teaching sessions. For example, the teacher could select a certain learning program at a low educational level as a beginning lesson for the child or young adult on the learning styled keyboard. If the child or young adult easily reaches or exceeds a particular program level, the teacher, without resetting the machine or otherwise disrupting the session, can upgrade the program and learning session to a next higher educational level. This upgrading is possible because the key strike signals generated by the standard computer keyboard 142 and presented to microprocessor 118 through I/O interface board 124 in the same manner as an ordinary personal computer system and further in parallel with key strike signals generated by the learning styled keyboard 140. Further, the learning session and upgrading to different educational levels can be accomplished in a substantially seamless manner without disrupting the lesson on the learning styled keyboard. Of course, if the child or young adult begins at too high an educational level, the teacher can select lower levels of educational software until the child or young adult is adequately challenged to learn the system on the learning styled keyboard 140.

FIG. 2A diagrammatically illustrates learning styled keyboard 140 and particularly the printed circuit board 160 having the keyboard microcontroller 162. In a preferred embodiment, keyboard microcontroller 162 is a Zilog Z86C31 microcontroller which operates functionally the same as a Zilog Z8602 microcontroller but utilizes newer technology at a lower cost. Extending from printed circuit board 160 is a ribbon cable 164 that leads to a keyboard switch matrix which is described later. Other components are mounted on printed circuit board 160 such as capacitors, resistors and other electronic components that are known to persons of ordinary skill in the art. These electronic components are necessary to provide a stable power supply to the keyboard microcontroller, condition the input and output signals and maintain sufficient voltage and currents for the keyboard matrix.

Figure 2B:
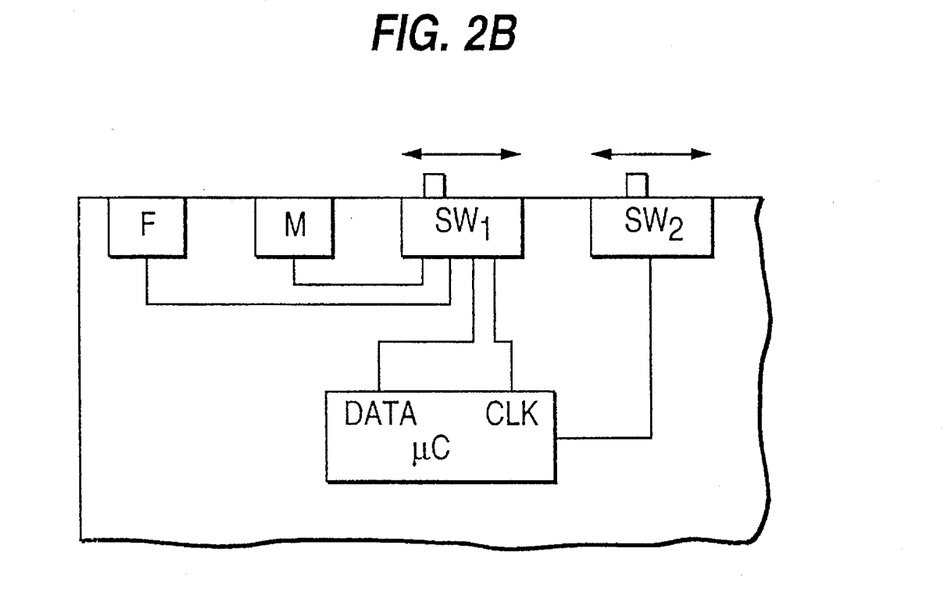
FIG. 2B diagrammatically illustrates the cable connectors, switches and microcontroller for the learning styled keyboard.

FIG. 2B diagrammatically illustrates the female F port, the male M port, keyboard switch $SW_1$, the microcontroller μC and an AT-XT keyboard switch $SW_2$. The keyboard switch $SW_1$ shifts control from the standard keyboard 142 to the learning styled keyboard 140. Data and clock times are passed to the μC. The AT-XT switch $SW_2$ shifts the operation of μC to emulate a different keyboard configuration (AT versus XT).

Figure 3:
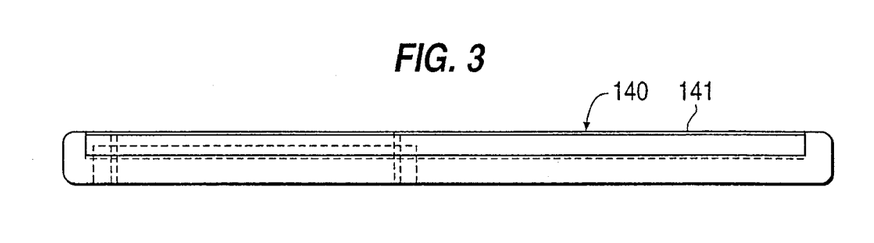
Figure 4:
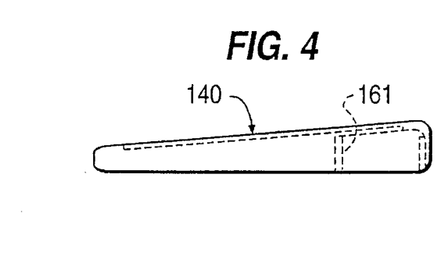

FIG. 3 diagrammatically illustrates a front elevational view of learning styled keyboard 140. As shown in FIG. 3, the top surface 141 is substantially flat and operates as a planar user interface surface. FIG. 4 diagrammatically illustrates a side elevational view of learning styled keyboard 140. As shown in FIG. 4, the keyboard has a generally geometric wedge shape with the print circuit board and electronics located in region 161 towards the back end of keyboard 140 elevated on legs or bar supports. Of course, output ports F and M 148, 146 are disposed at the rear face of learning styled keyboard 140 as shown in FIGS. 2A and 2B as are switches 157, $SW_1$ and $SW_2$.

Figure 5:
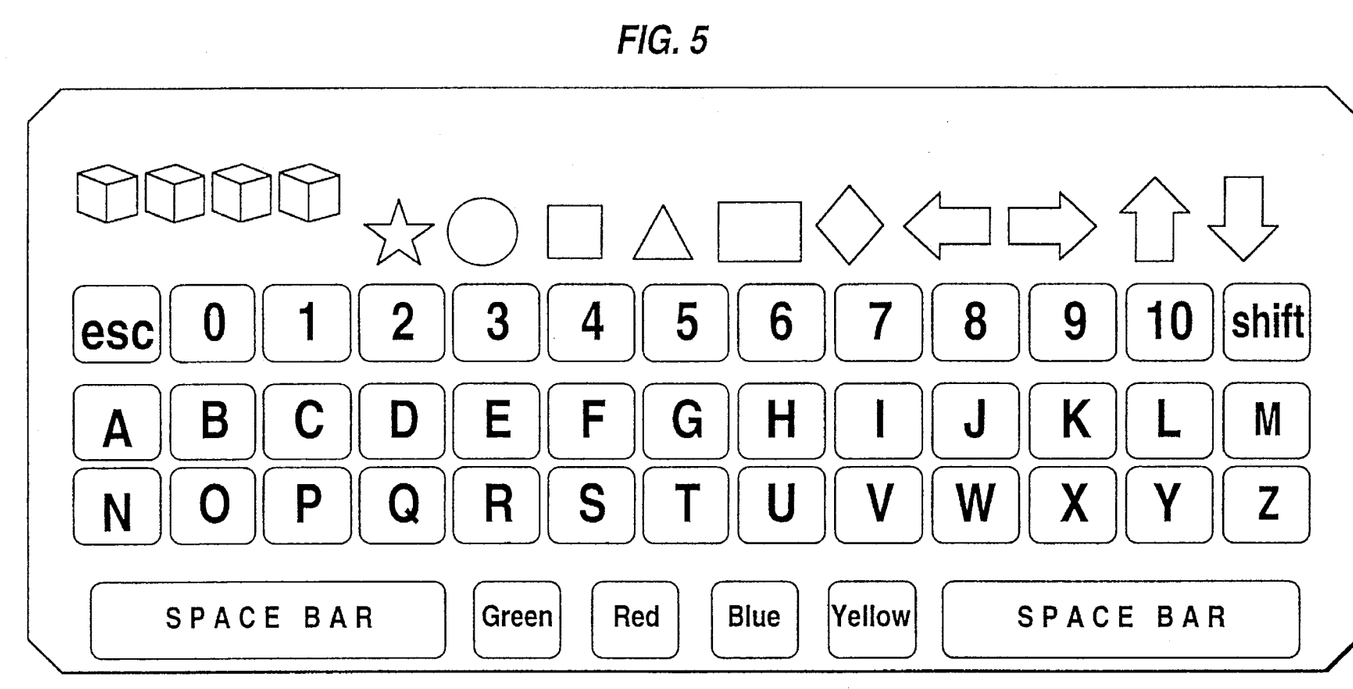
FIG. 5 diagrammatically illustrates the layout of the keys as well as the color coding associated with each key for the learning styled keyboard in accordance with the principles of the present invention.

FIG. 5 diagrammatically illustrates the key layout, the key configuration, and the color of the keys for the learning styled keyboard. The keyboard is about 16"×7"×1" as shown in FIG. 5, and as listed in the Exemplary Conversion Table below, each key or group of keys has a unique color. For example, the unique color coding for numeric keys 0–9 and the catenated numeric key 10 (caused by electronic generation of key strike signals for 1 and 0), enables the software, run on personal computer system 110, to prompt the user to press the green number 4 key. The user, typically a child or young adult, can first easily locate the type of key by its color and then further locate the specific prompted key based on the indicia marked on the key face. The present invention covers this concept. Rather than utilize function keys F1–F12, the learning styled keyboard utilizes keys shaped as stars, circles, squares, rectangles etc. Other key shapes may be utilized. These special keys are further color coded as shown in the Exemplary Conversion Table and as illustrated in FIG. 5. The keyboard does not include major control keys such as control, alternate or delete to protect the computer system from inadvertent reboot, crash or alteration.

| Exemplary Conversion Table | | |
|---|---|---|
| Learning Key | Color | Resultant Key |
| Star | Red | F1 |
| Circle | Orange | F2 |
| Square | Yellow | F3 |
| Triangle | Green | F4 |
| Rectangular | Purple | F5 |
| Diamond | Blue | F6 |
| Arrow Keys | Blue | As illustrated |
| Caps Lock | Cyan | Cap Lock |
| Green Square | Green | F7 |
| Red Square | Red | F8 |
| Blue Square | Blue | F9 |
| Yellow Square | Yellow | F10 |
| Escape | Cyan | Escape |
| Numerics 0–9 | Green | Numerics |
| No. 10 | Green | Catenated |
| Space | Red | Space |
| Enter | Purple | Enter |
| Alpha | Yellow | Alpha |

The layout of the keys for the learning keyboard is generally alphabetic. The numerics key "10" is a catenated key such that the digital key strike signal sent to the personal computer system is a combination of key "1" and key "0". The color coding of groups of keys is an important aspect of the present invention in that the color can be used with the computer software to enhance the learning capability of the user.

Figure 6:
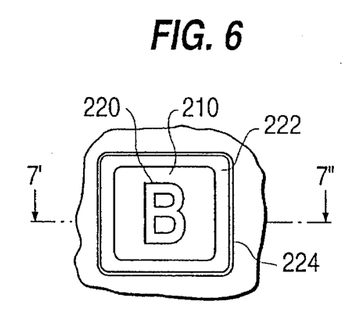
FIG. 6 diagrammatically illustrates a top view of a single key.
Figure 7:
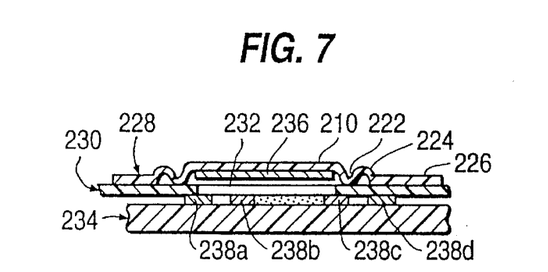
FIG. 7 diagrammatically illustrates a cross sectional view of a single key from the perspective of section line 7'-7" in FIG. 6.

FIG. 6 diagrammatically illustrates the "B" key which is representative of all the keys on the learning styled keyboard. The key consists of a membrane switch dome 210 having a central indicia region 220 located thereon. Each key is about 1"×1". Raised switch dome 210 is peripherally defined by a proximal key channel region 222 which leads, in outboard direction, to a raised, circumferential, tactile key ridge 224. FIG. 7, which is a cross sectional view of the B key also illustrates membrane switch dome 210, proximal key channel 222 and peripheral tactile key ridge 224. As shown, key ridge 224 rises above surface 226 which generally establishes the planar user interface.

Each key switch is a membrane switch consisting of an insulated or a plastic primary or top layer which is unitary with the entire planar user interface. The keyboard top surface is a single, uninterrupted and sealed structure. This top first layer is identified as layer 228 in FIG. 7. Layer 230 is a spacing layer. A secondary or intermediate layer 230 (typically identified as a spacer in the industry) includes a plurality of large apertures therethrough beneath each key dome such as aperture 232 for the B key illustrated in FIG. 7. The tertiary layer 234 of the keyboard and each membrane switch is also made of plastic. In addition to insulative layers 228, 230 and 234, each membrane switch has a conductive patch or panel 236 on an inboard side of each key dome which, upon depression of the dome, closes the normally open electrical junction between a plurality of interstitial conductors 238a, 238b, 238c and 238d. It should be noted that FIG. 7 does not accurately show the dimensions of the switch components nor the multiplicity of normally opened conductive strips 238a–238d but is only illustrative of those items.

Figure 8:
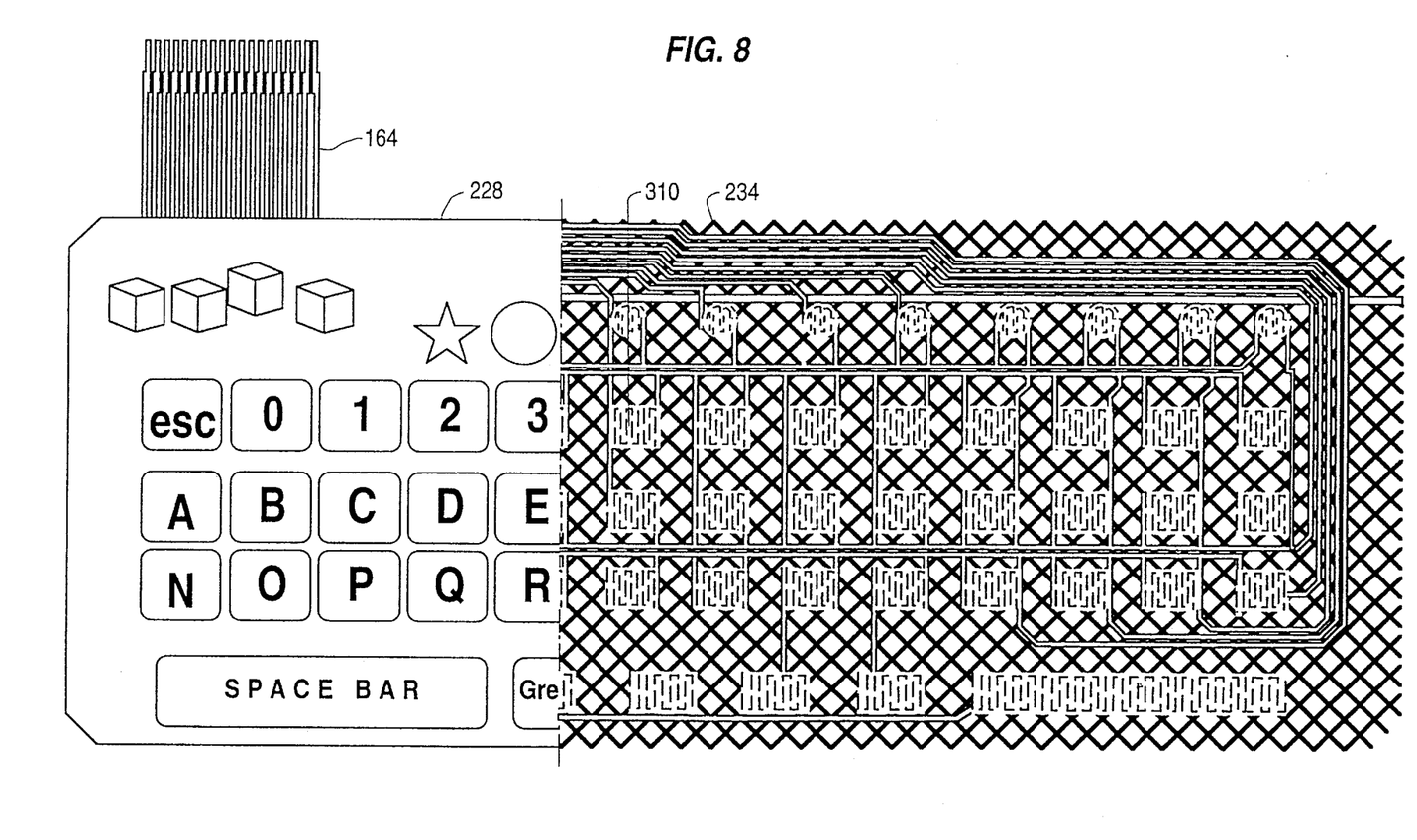
FIG. 8 diagrammatically illustrates a partial view of the planar use interface, portions of multiple membrane switches and a partial view of the tertiary layer for multiple membrane switches.
Figure 9:
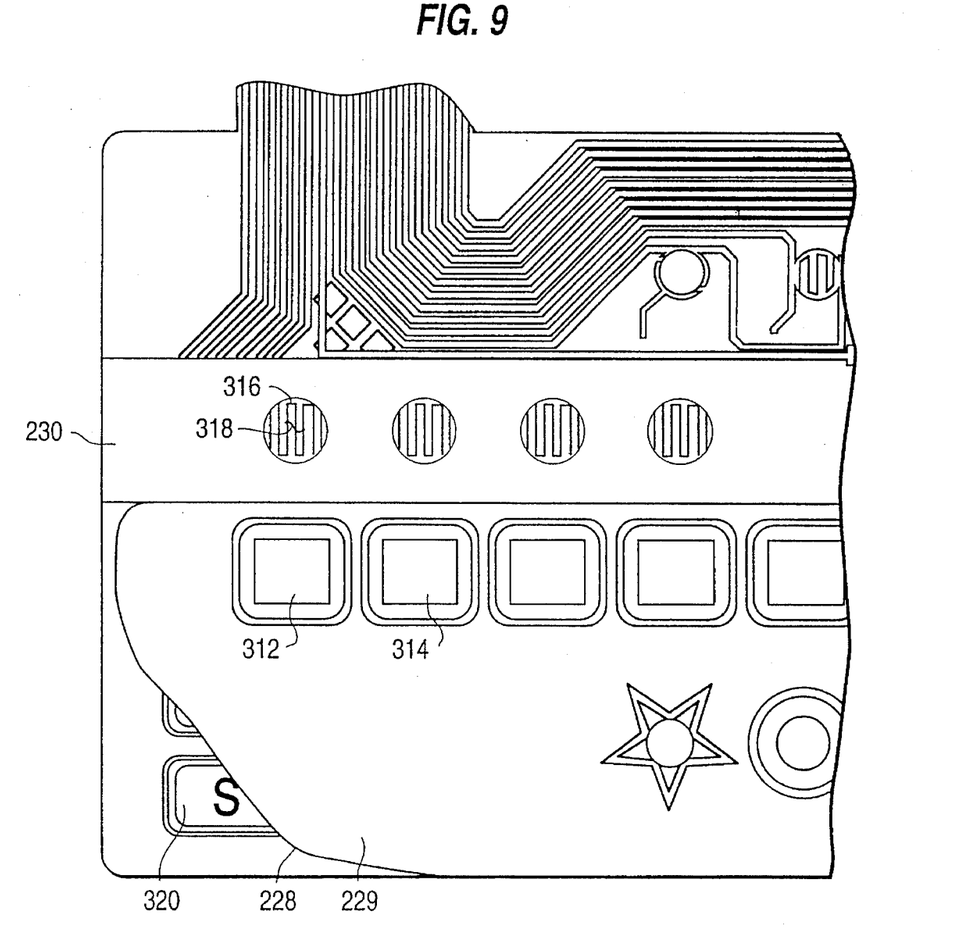
FIG. 9 diagrammatically illustrates the top or primary layer, the underside of that top layer, the intermediate insulative or spacing layer and the tertiary layer for the keyboard membrane switches in accordance with the principles of the present invention.

FIGS. 8 and 9 diagrammatically illustrate the three layers of the keyboard configuration as well as the plurality of normally opened conductive interstitial strips beneath each switch dome. In FIG. 8, the top layer 228 is partially illustrated with keyboard matrix connector ribbon 164 (see FIG. 2A) extending from an upper left hand edge of the multiple layer switch structure. The lower or tertiary layer 234 of the composite key structure is also illustrated towards the right hand side of the figure. The tertiary layer 234 carriers on its top face a plurality of conductive strips which together form a keyboard switch matrix. For example, area 310 illustrates the conductive strips immediately beneath key number 4. These conductive strips are, in preferred embodiment, a set of interstitial vertically interlaced strips half of which are connected to an upper connector channel and the balance are connected to a lower connector channel.

FIG. 9 diagrammatically illustrates the inboard surface 229 of the top keyboard layer 228. The inboard surface carries thereon a plurality of conductive plates or coated regions 312, 314 etc. Conductive flexible plate region 312 is immediately beneath the escape switch key dome whereas conductive region 314 is immediately beneath the zero numeric switch key dome. Upon depression of the escape key, the dome flexes or warps to a concave shape and the conductive plate 312 protrudes through aperture 316 in insulative layer 230 thereby making electrical contact between the interstitial fingers of the key junction in region 318. When the normally opened conductive fingers in region 318 are electrically connected together, the microprocessor controller, coupled to the keyboard matrix, recognizes the closure of that key junction and switch based on the depression of the escape key dome. The outboard switch dome surface 320 for the SPACE key is also partially diagrammatically illustrated in FIG. 9.

Figure 10:
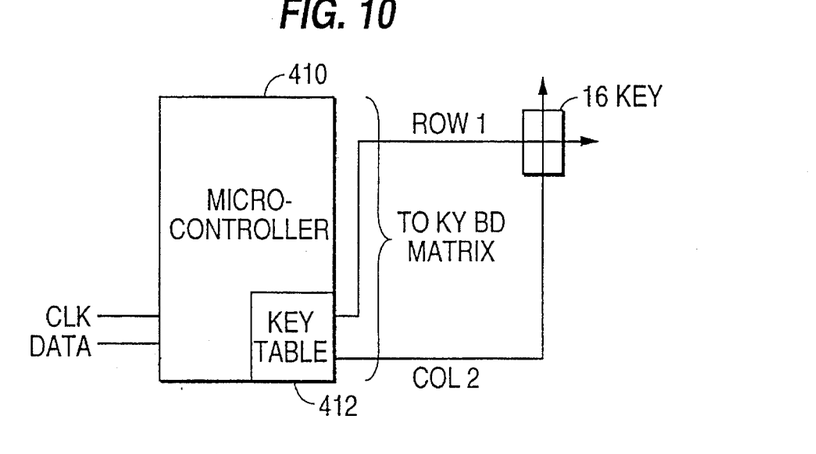
FIG. 10 diagrammatically illustrates the microcontroller and the keyboard matrix.

FIG. 10 diagrammatically illustrates microcontroller 410 which in the preferred embodiment is a Zilog Z86C31 microcontroller although the older Zilog Z8602 chip may be used. A clock CLK signal and a DATA line are electrically connected to microcontroller 410. The microcontroller 410 has a key table 412 in a memory which translates the position of each actuated key from the key matrix into a key strike data signal or a digital representation of a key strike signal. The key strike signals are generated from the keyboard matrix which is essentially a series of rows and columns described above with the interstitial key junctions. The microcontroller 410 identifies each key by row and column. This identification occurs based upon periodic polling of the normally opened switch junctures or key switch matrix.

As described in the Zilog Z8602 product brochure, each key has associated therewith a key attribute data bit or byte. The Key Attribute Table which follows identifies the various key attributes that are associated with each key. These two binary bit key attributes are loaded into a key-type register of the microcontroller. The key attributes associated with each key are recognized by programs or modules in the microcontroller which, in turn, generates one or more digital key strike signals ultimately retrieved by the microprocessor in the personal computer system.

| Key Attribute Table | |
|---|---|
| Attribute | Key-Type Register |
| Make-typematic-break | 00 |
| Make-typematic | 01 |
| Make-break | 10 |
| Make-only | 11 |

A typematic key is a key which, upon continual depression by the user, continually results in the generation of multiple key strike data signals. In other words, if the user depresses an "A" key on a common or standard computer keyboard, a digital representation of the A key strike will continual be sent to the central processing unit in the personal computer system. This continual generation of the A signal is a result of the software programmed in the keyboard microcontroller designating the A key as a typematic key. Accordingly, almost all of the keys on a common keyboard are typematic keys. The typematic keys have associated therewith a key attribute binary 00. In other words, upon closure of the alpha numeric key, the microprocessor will generate a make signal, indicating that the key was struck, a typematic signal indicating that repetitive key strike data signals are produced, and a break signal when the user lifts his or her finger from the key (the break signal indicating the opening of the key switch). Another type of key is the make-typematic key which has an attribute 01. Another type of key is the make-break key which is key attribute 10. The "shift" key is normally a make-break key. The last key attribute is a make-only key 11. The "escape" key is normally a make-only key.

The Common Key Attribute table shown below gives an example of certain attributes commonly associated with certain keys.

| Common Key Attribute Table | | |
|---|---|---|
| Key | Key Status | Key-Type Register |
| Escape | make-only | 11 |
| Shift | make-break | 10 |
| Alpha-numerics | make-typematic-break | 00 |

For example in a standard keyboard, upon depression of the escape key, the keyboard microcontroller only generates a make-only signal because of the Key Attribute Table loaded into the microcontroller's memory correlates attribute 11 to the switch corresponding to the escape key. In contrast thereto, upon depression of the shift key, a make signal is generated upon depression of the key and a "break" signal is generated upon opening of the key switch. This key attribute is 10. The other alpha numeric keys are customarily designated with a make-typematic-break signal having a key attribute 00.

In the Modified Key Attribute table in accordance with the present invention and shown below, the "common" or standard key attributes have been changed for all the keys. In the learning styled keyboard, created and developed in accordance with the principles of the present invention, the alpha numeric keys are designated make-only. This is accomplished by assigning a key attribute 11 to these keys similar to the escape key.

| Modified Key Attribute Table | | |
|---|---|---|
| Key | Key Status | Key-Type Register |
| Alpha-numerics | make-only | 11 |
| Cursor control (arrows) | make-typematic-break | 00 |
| Shift | make-break | 10 |
| Escape | make-only | 11 |

By utilizing the Modified Key Attribute table set out above, the child or young adult upon the depression of, for example, the C key, the learning styled keyboard generates only a single key strike data signal representing C. It does not generate continual C data signals upon continual depression of that key. Otherwise, if the child or young adult depresses the cursor control keys, which are represented by blue arrows in FIG. 5, those keys are designated make-typematic-break keys and assigned key attributes 00. Multiple key strike signals are generated and sent to the personal computer. The shift key is still designated make-break with a key attribute 10 and the escape key is also designated make-only as is commonly found with computer keyboards. The software gating of the alpha-numeric keys described herein may be accomplished through software on the personal computer. The present invention covers this concept.

The present invention, in addition to modifying the key attribute tables for the entire keyboard, also reassigns certain keys. The Partial Key Code table listed below gives an example of the reassignment.

| Partial Key Code Table | | | | | | |
|---|---|---|---|---|---|---|
| Standard Key | Q | W | E | R | T | Y |
| Learning Key | Esc | 0 | 1 | 2 | 3 | 4 |
| Key Number | 17 | 18 | 19 | 20 | 21 | 22 |
| Make Code | Hex1 | Hex3 | — | — | — | — |
| Break Code | Hex2 | Hex4 | — | — | — | — |

In this Partial Key Code table, the standard keys QWERTY are illustrated. In contrast thereto, the learning styled keyboard identified in the table as "learning key" assigns the escape key for key number 17, numerics 0–4 to keys 18–22. The Key Code Table is loaded into the keyboard microcontroller memory. Each key in the key switch matrix has an assigned key number. These key numbers do not change since the key numbers designate physical locations of the keys in the switch matrix. Each key switch has associated therewith a make code as well as a break code. These are hexadecimal codes that are readily identified by the microprocessor in the personal computer. In the Partial Key Code table listed above, these hex codes are abbreviated simply as Hex 1, Hex 2, Hex 3 and Hex 4.

The Partial Scan Code Set table shown below illustrates a number of keys as well as the make-code, break code and default status. The Partial Scan Code Set table should be viewed in conjunction with FIG. 11.

Figure 11:
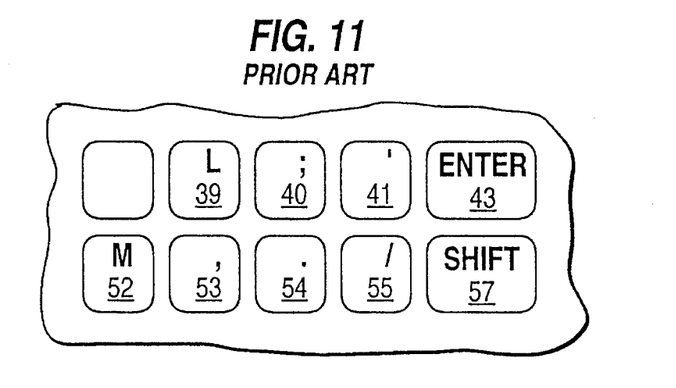
FIG. 11 diagrammatically illustrates a partial, cut-away view of a standard keyboard layout with keys and associated key numbers in accordance with the prior art.

| Partial Scan Code Set Table | | | | |
|---|---|---|---|---|
| | | | Default Status | |
| Key No. | Make Code | Break Code | New | Old |
| 1 | Hex 1 | Hex 2 | M | T |
| . | | | | |
| 39 | Hex 3 | Hex 4 | M | T |
| 40 | Hex 5 | Hex 6 | M | T |
| 41 | Hex 7 | Hex 8 | M | T |
| . | | | | |
| 43 | Hex 9 | Hex 10 | M | T |
| . | | | | |
| 52 | Hex 11 | Hex 12 | M | T |
| 53 | Hex 13 | Hex 14 | M | T |
| 54 | Hex 15 | Hex 16 | M | T |
| 55 | Hex 17 | Hex 18 | M | T |
| . | | | | |
| 57 | Hex 19 | Hex 20 | M | M/B |

FIG. 11 illustrates a prior art device and only a small portion of the standard keyboard. The standard keyboard has an enter key which is designated as key number 43, a shift key designated as key number 57, and other keys such as L key 39 and M key 52. These keys are shown in the Partial Scan Code Set table above. Also, the default status for these keys is identified. The old or common default status for the L key 39 and the M key 52 is typematic or T code. In the new default status in accordance with the principles of the present invention, key numbers 39 and 52 are designated Make codes only or M codes. In other words, upon depression of key 39 or key 52, the keyboard microcontroller generates one digital key strike data signal notwithstanding the fact that the child or young adult continually depresses the key.

This aspect of the present invention is important because a child or a young adult, when learning to use a computer keyboard, normally continually depresses the key. With a customary or standard keyboard, continual depression of the C key will generate in a plurality of C key strike data signals being sent to the personal computer central processor. In the presently configured learning styled keyboard, continual depression of the C key will result in a single C key strike data signal being sent to the personal computer processor.

Figure 12:
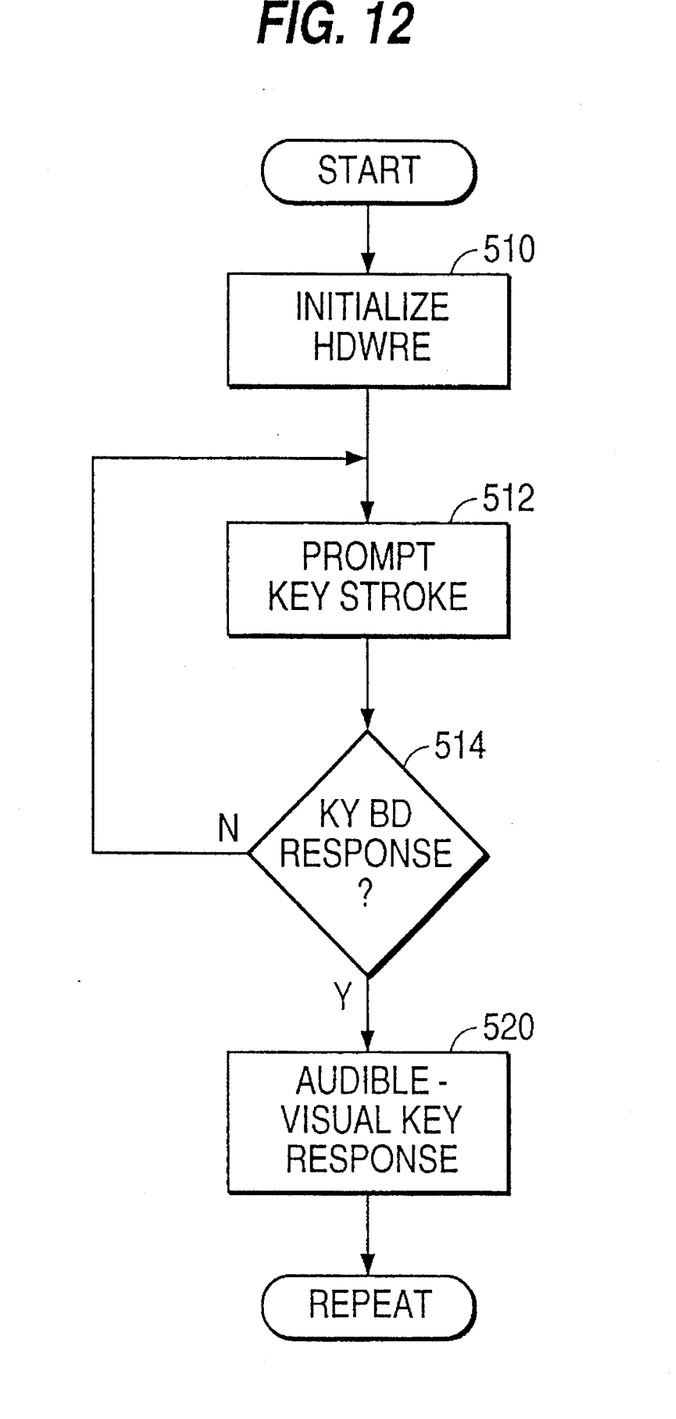
FIG. 12 diagrammatically illustrates one flow chart showing the operation of the learning styled keyboard; and, FIG. 13 diagrammatically illustrates a stand alone learning styled keyboard.

FIG. 12 diagrammatically illustrates a flow chart showing the data processing steps which may be used in conjunction with the learning styled keyboard. In step 510, the hardware and the personal computer system is initialized. In step 512, the computer program prompts the user to strike a single key on the learning styled keyboard. This prompting can be audio, visual or a combination of both. The sound generator in the personal computer would generate the sound as an audio stimulus or prompt. The monitor in the computer system would generate a visible prompt. In decision step 514, the data processing determines whether the keyboard has responded. If the no branch is taken, the program repeats the prompt step 512. If the yes branch is taken an audible, visual or combination response is generated in step 512. If the proper key was struck by the child or young adult, a rewarding pleasurable visual or audio response would be issued by the personal computer system. If an improper key was struck, the computer system would issue a negative type audio or visual or combination signal. Alternatively, the keyboard 140 could carry a sound generator.

At start-up, the learning styled keyboard has a program or software/hardware setting which delays the clock and data line activation for about 30 seconds. This latent delay at start-up permits the computer system to completely initialize thereby avoiding any control problems if a child is playing with the keyboard.

Figure 13:
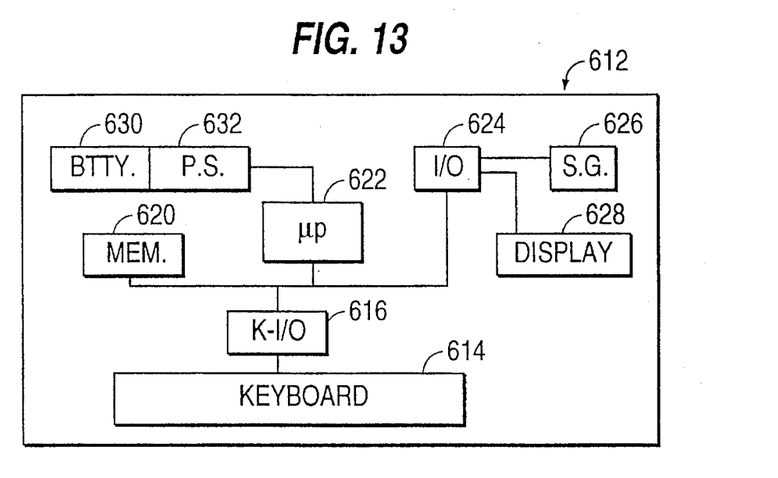

Although the present invention has been primarily discussed in conjunction with a personal computer system, the learning styled keyboard could also be incorporated as a stand alone device. FIG. 13 diagrammatically illustrates a stand alone device 612 having learning styled keyboard 614 similar in nature to that described above in conjunction with FIGS. 5–9. Keyboard 614 is electronically connected to keyboard input/output circuit 616. The input/output circuit or device is connected to an internal bus which also connects memory 620, microprocessor 622, supplemental input/output device 624, sound generator 626 and visual display 628. The microprocessor as well as the other components and stand alone learning styled keyboard 612 are connected to a battery 630 and a power supply such as transformed 632. Of course, the battery and power supply may be coupled directly to the other electrical components.

The claims appended hereto are meant to cover modifications and changes within the spirit and scope of the present invention.

What is claimed is:

1. A computer-based method for configuring and operating a computer keyboard to enhance a user's education comprising the steps of:

providing a programmable computer system having electronically coupled together a monitor, a central processing unit, a memory, a sound generator and a keyboard input/output interface;

providing a standard computer keyboard;

providing a learning-styled keyboard with a substantially flat and planar user interface surface having a plurality of discrete keys, each key including a switch and corresponding switch dome and indicia thereat;

providing a mechanically actuated, electrical switch;

electrically connecting either said standard computer keyboard or said learning-styled keyboard to said keyboard input/output interface based exclusively upon the position of said electrical switch;

when said electrical switch electrically connects said learning-styled keyboard to said keyboard input/output interface:

prompting said user, with one of a visual prompt from said monitor and an audible prompt from said sound generator, to actuate a prompted key represented by a respective indicia on a corresponding switch dome on said user interface surface;

in said learning-styled keyboard, generating one digital key strike signal based upon actuation of one of said discrete switch domes and associated switch on said user interface surface and transmitting said key strike signal to said central processor unit via said keyboard input/output interface;

providing at least one of an audible and a visual feedback indicator to said user from said sound generator and said monitor respectively upon receipt of said key strike signal at said central processing unit; and, solely in said learning-styled keyboard, inhibiting generation of multiple digital key strike signals representing multiple key strikes whether based upon continual actuation of said one discrete switch dome and associated switch or based upon actuation of a plurality of discrete switch domes and associated switches within a predetermined time period;

when said electrical switch electrically connects said standard computer keyboard to said keyboard input/output interface:

controlling said programmable computer system exclusively from said standard computer keyboard.

2. A computer-based method for configuring and operating a computer keyboard to enhance a user's education comprising the steps of:

providing a programmable computer system having electronically coupled together a visual display monitor, a central processing unit, a memory, a sound generator and a keyboard input/output interface;

providing a standard computer keyboard;

providing a learning-styled keyboard with a substantially flat and planar user interface surface, said learning-styled keyboard having a plurality of discrete switches with a corresponding plurality of depressible keys on said planar user interface surface, each key having a face bearing indicia uniquely marking each switch;

providing a mechanically actuated, electrical switch;

electrically connecting either said standard computer keyboard or said learning-styled keyboard to said keyboard input/output interface based exclusively upon the position of said electrical switch;

when said electrical switch electrically connects said learning-styled keyboard to said keyboard input/output interface:

prompting said user with one of a visual prompt and an audible prompt representative of one of said key indicia to actuate a discrete key and corresponding switch on said user interface surface, said visual prompt and audible prompt being respectively issued from said monitor and from said sound generator;

in said learning-styled keyboard, generating and presenting to said processing unit only one digital key strike representation based upon actuation of one of said discrete keys and corresponding switch via said keyboard input/output interface;

issuing at least one of an audible and a visual feedback indicator to said user from said sound generator and said monitor respectively upon receipt of said digital key strike representation at said central processing unit; and, in said learning-styled keyboard, inhibiting generation of multiple key strike representations whether based upon continual depression of said one discrete key or based upon actuation of a plurality of discrete keys and corresponding switches within a predetermined time period;

when said electrical switch electrically connects said standard computer keyboard to said keyboard input/output interface:

controlling said programmable computer system exclusively from said standard computer keyboard.

3. A computer-based method as claimed in claim 2 wherein said depressible keys include switch domes and the method includes compressing said switch dome to actuate said corresponding switch.

4. A computer-based method as claimed in claim 3 wherein the step of compressing includes creating a concave deformation with said switch dome.

5. A computer-based method as claimed in claim 4 wherein actuation of said corresponding switch includes the step of electrically linking a normally open intersection of a switch matrix.

6. A computer-based method as claimed in claim 5 wherein each key face is delineated on said planar user interface surface with a corresponding key channel and including the step of tactually locating key with one of said key channel and said switch dome.

7. A computer-based method as claimed in claim 6 including the step of polling each switch during a predetermined cycle and generating said only one digital key strike representation notwithstanding the response from said polling until said one discrete key and corresponding switch is deactivated.

8. A computer-based method as claimed in claim 2 including, in said learning-styled keyboard, the step of inhibiting an initial generation of digital key strike signals representing one or more key strikes during a predetermined time period after initialization of said programmable computer system.

9. A computer-based method as claimed in claim 7 including, in said learning-styled keyboard, the step of inhibiting an initial generation of digital key strike signals representing one or more key strikes during a predetermined time period after initialization of said programmable computer system.

10. A computer-based method as claimed in claim 9 including defining switch dome islands on a unitary flat planar user interface surface.

11. A computer-based method as claimed in claim 2 wherein the steps of generating and presenting and the step of inhibiting generation includes the step of translating said one key strike as a make only key strike.

12. A computer-based method for configuring and operating a computerized keyboard to enhance a user's education comprising the steps of:

providing a unitary computer-based system having electronically coupled together a visual display, a central processing unit, a memory, a sound generator and a standard computer keyboard;

providing a learning-styled keyboard with a substantially flat and planar user interface surface, said learning-styled keyboard having a plurality of discrete switches with a corresponding plurality of depressible keys on said planar user interface surface, each key having a face bearing indicia uniquely marking each switch;

providing a mechanically actuated, electrical switch;

electrically connecting either said standard computer keyboard or said learning-styled keyboard to said keyboard input/Output interface based exclusively upon the position of said electrical switch;

when said electrical switch electrically connects said learning-styled keyboard to said keyboard input/output interface:

prompting said user with one of a visual prompt and an audible prompt representative of one of said key indicia to actuate a discrete key and corresponding switch on said user interface surface, said visual prompt and audible prompt being respectively issued from said monitor from said sound generator;

in said learning-styled keyboard, generating and presenting to said processing unit only one digital representation of a key strike based upon actuation of one of said discrete keys and corresponding switches;

issuing at least one of an audible and a visual feedback indicator to said user from said sound generator and said monitor respectively upon receipt of said digital representation at said central processing unit; and, inhibiting generation of multiple key strikes whether based upon continual depression of said discrete key or based upon actuation of a plurality of discrete keys and corresponding switches within a predetermined time period;

when said electrical switch electrically connects said standard computer keyboard to said keyboard input/output interface:

controlling said programmable computer system exclusively from said standard computer keyboard.

13. A learning styled keyboard for use in conjunction with a programmable computer system, said computer system having electronically coupled together a visual display monitor, a central processing unit, a memory, a sound generator and a standard computer keyboard and a keyboard input/output interface, said learning styled keyboard comprising:

a substantially flat and planar user interface surface mounted atop a keyboard case, a plurality of discrete switches mounted within said case and beneath said user interface surface, a corresponding plurality of depressible keys on said planar user interface surface above said switches, each key having a face bearing indicia uniquely marking each switch;

said user interface surface being a unitary structure with said plurality of depressible keys rising there above; and means for generating only one digital key strike representation based upon actuation of one of said discrete keys and corresponding switch and inhibiting generation of multiple key strike representations whether based upon continual depression of said one discrete key or based upon actuation of a plurality of discrete keys and corresponding switches within a predetermined time period;

a mechanically actuated master electrical switch;

a first cable electrically connecting said keyboard interface in said computer system with said means for generating in said learning-styled keyboard via said master electrical switch when said electrical switch is in a first switch position; and a second cable electrically connecting said keyboard interface and said standard computer keyboard via said master electrical switch when said electrical switch is in a second switch position.

14. A keyboard as claimed in claim 13 wherein said switches are membrane switches and said depressible keys are part of the unitary, single layer user interface surface.

15. A keyboard as claimed in claim 14 wherein said depressible keys are domes for said membrane switches.

16. A keyboard as claimed in claim 15 wherein said domed membrane switches include a conductive layer on an inboard surface of said dome which electrically connects a normally open electrical junction in a switch matrix for said keyboard.

17. A keyboard as claimed in claim 14 wherein each dome is circumscribed with a channel to enhance tactual location of said depressible key.

18. A keyboard as claimed in claim 16 wherein each dome is circumscribed With a channel to enhance tactual location of said depressible key.

19. A keyboard as claimed in claim 13 wherein said learning styled keyboard includes means for inhibiting generation of said digital key strikes during a predetermined period after initialization of said computer system.

20. A keyboard as claimed in claim 18 wherein said learning styled keyboard includes means for inhibiting generation of said digital key strikes during a predetermined period after initialization of said computer system.

21. A keyboard as claimed in claim 13 wherein said means for generating includes a make only means.

22. A keyboard as claimed in claim 20 wherein said means for generating includes a make only means.

23. A keyboard as claimed in claim 19 including an input and an output port for interfacing keyboard cables.

24. A keyboard as claimed in claim 23 wherein one of said interfacing keyboard cables is a standard keyboard extension cable.

25. A keyboard as claimed in claim 20 including an input and an output port for interfacing keyboard cables.

* * * * *